2,563,138

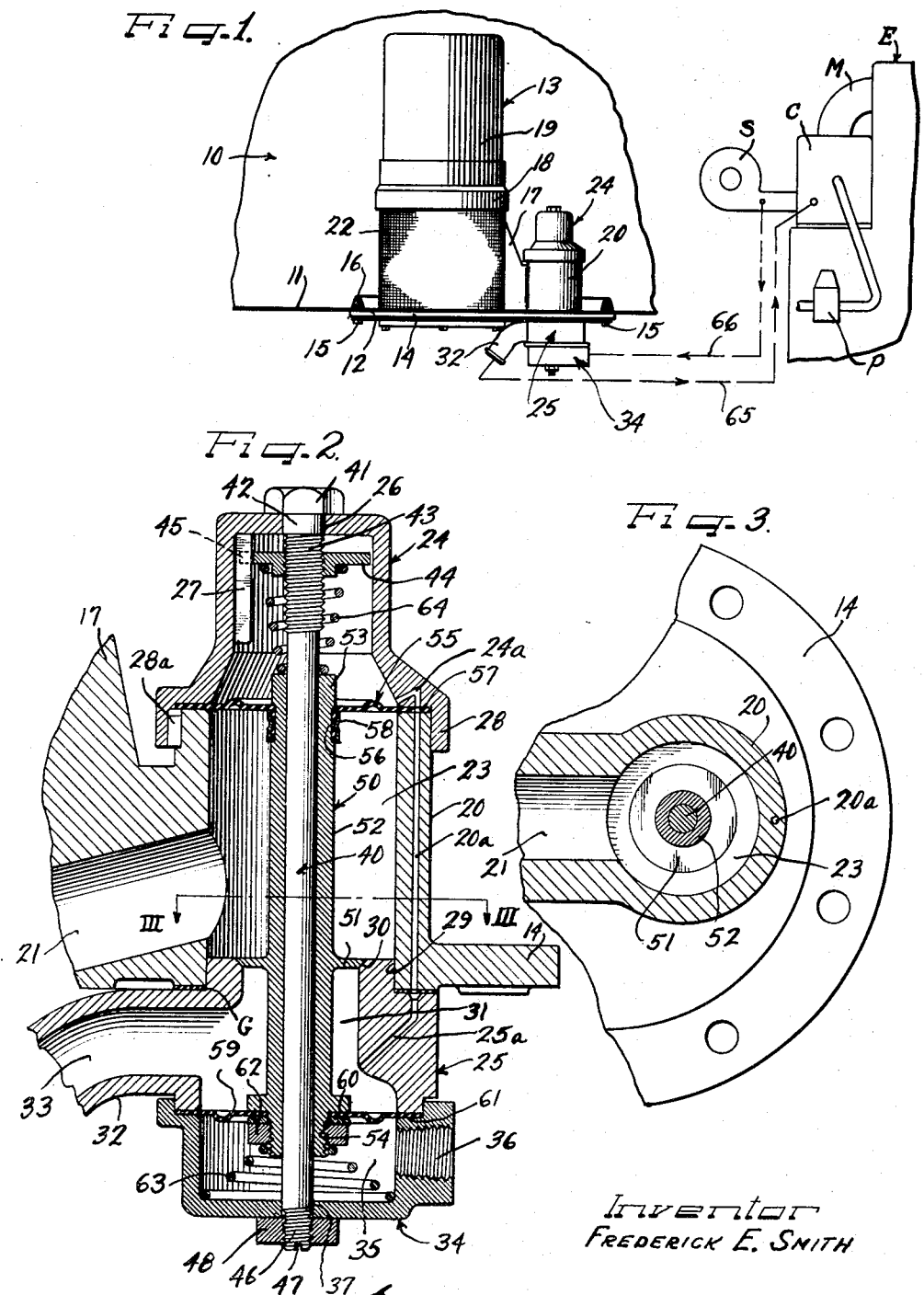
Aug. 7, 1951 — F. E. SMITH — 2,563,138
PUMP REGULATOR
Filed Aug. 21, 1946
Inventor
FREDERICK E. SMITH Patented Aug. 7, 1951

UNITED STATES PATENT OFFICE 2,563,138

PUMP REGULATOR

Frederick E. Smith, Cleveland Heights, Ohio, assignor to Thompson Products, Inc., Cleveland, Ohio, a corporation of Ohio Application August 21, 1946, Serial No. 692,019

10 Claims. (Cl. 103—19)

This invention relates to a regulator adapted to deliver a selected constant pressure irrespective of pressure fluctuation in the source of said pressure. Specifically the invention deals with a pressure regulator conveniently attached to a pump and balanced in relation to a base pressure for delivering a constant pressure differential above the base pressure even though the base pressure fluctuates.

The invention will hereinafter be specifically described as embodied in a pump regulator for an electric motor driven submerged centrifugal type pump arranged to inject water or a supplementary fuel into the carburetor of an engine.

In accordance with this invention a centrifugal pump has a mounting base for attachment to the bottom wall of a tank to support the pump in the bottom of the tank. The pump receives water or supplementary fuel from the tank through a screened inlet and pressures the liquid to an outlet passageway equipped with the pump regulator of this invention. One end of the passageway is closed by a diaphragm. The other end of the passageway is closed by a valve. The passageway discharges, through an attachment or fitting, to the carburetor of an airplane engine or the like. The valve is mounted on a hollow stem which slides on a rod. The stem is opposed at opposite ends by coil springs which are adjusted from outside of the tank to control the pressure setting for the regulator. The diaphragm at one end of the passageway is attached to one end of the stem. A second diaphragm is attached to the other end of the stem in the passageway provided by the fitting. The back face of this diaphragm is connected to supercharger pressure.

The coil springs are so adjusted that the valve is held open before the pump is started. After the pump is started, the fluid flows readily through the valve until pressure in the regulator discharge line becomes high enough to allow the adjacent diaphragm to close the valve. This diaphragm also maintains the proper discharge pressure with changes in supercharger pressure. The diaphragm at the other end of the regulator balances out the fluid forces acting directly on the valve itself.

The pump regulator of this invention is conveniently installed on a submerged type pump having the discharge passageway thereof arranged to receive fittings on opposite ends and with one of the fittings being mounted outside of the tank in which the pump is submerged.

It is, then, an object of this invention to provide a pump regulator for maintaining fluid delivery under predetermined pressure irrespective of variations in pump delivery pressure.

Another object of the invention is to provide a regulator for controlling pressure from a pump or the like to maintain a predetermined pressure differential above a selected base pressure that may fluctuate.

Another object of the invention is to provide a pressure regulator conveniently attached to the casing defining the pump outlet and pressure balanced with relation to a base pressure and pump pressure.

A still further object of this invention is to provide a simplified pressure regulator for a submerged type pump having an open ended hollow boss portion for housing the regulator wherein the regulator is equipped with valve mechanism supported by fittings on opposite ends of the boss.

A specific object of the invention is to provide a pump regulator for an injection pump supplying an airplane carburetor with supplementary fuel or the like wherein pressure of the fuel is maintained at a selected level based on air pressure in the carburetor.

A still further object of this invention is to provide a pump regulator for a submerged type pump that is readily adjusted from outside of a tank on which the pump is mounted.

Other and further objects of the invention will be apparent to those skilled in the art from the following detailed description of the annexed sheet of drawings which, by way of preferred example only illustrates one embodiment of the invention.

On the drawings:

Figure 1 is a side elevational view of a submerged pump equipped with a pump regulator according to this invention and mounted on the bottom wall of a tank as shown in vertical cross section. Fig. 1 also includes a diagrammatic illustration of an airplane engine, a carburetor for the engine, and a supercharger to illustrate the manner in which the pump and pump regulator of this invention is used for injecting supplemental fuel into the carburetor.

Figure 2 is a vertical cross sectional view of a pump regulator according to this invention and illustrating parts of the pump on which it is mounted.

Figure 3 is a horizontal cross sectional view, with parts in plan, taken along the line III—III of Fig. 2.

As shown on the drawings:

In Fig. 1 the reference numeral 10 designates generally a tank for containing water, fuel or the like. The tank 10 has a bottom wall 11 with an aperture 12 therein. A centrifugal pump and motor unit 13 is mounted in the tank through the opening 12. This unit 13 has a base plate 14 providing a mounting flange underlying the tank wall 11 and receiving cap screws 15 at spaced intervals therearound to suspend the unit from a mounting ring 16 mounted in the tank on the bottom wall 11 around the opening 12.

The unit 13 includes a pump casing with an upstanding leg 17 supporting a mounting ring 18 on which is carried an electric motor in a casing 19. The pump casing has an upstanding open ended hollow boss 20 integral with the base plate 14 and opening through the base. This boss 20 communicates with the discharge outlet 21 (Fig. 2) from the pumping chamber (not shown) of the pump. The pump has a screened inlet 22 beneath the motor support ring 18 and receives liquid freely from the interior of the tank 10 to pressure the liquid through the outlet passageway 21 into the vertical open-ended passageway 23 provided by the hollow boss 20. The pump is preferably of the centrifugal impeller type.

In accordance with this invention, a cap 24 is mounted on one end of the hollow boss 20 inside of the tank 10 and a fitting 25 is mounted on the other end of the boss outside of the tank. A gasket G is interposed between the fitting 25 and boss 20. The cap 24 has an aperture 26 in its top wall thereof and a longitudinally extending key or rib 27 along its side wall. The cap includes a skirt portion 28 embracing the upper end of the boss 20 and receiving a key 28a therein in grooves in the boss and skirt to hold the cap against rotation on the boss.

The fitting 25 includes a pilot portion 29 extending into the lower end of the hollow boss 20. This pilot portion has a beveled valve seat 30 in its upper face converging to a passageway 31 in the fitting. A conduit nipple 32 is provided on the fitting 25 and has a discharge passageway 33 communicating with the passageway 31 intermediate the ends of the passageway 31.

A cap member 34 is provided for the bottom of the fitting 25 and has a blind open top chamber 35 therein for underlying the bottom end of the passageway 31 in the fitting 25. A laterally extending internally threaded nipple 36 provides a port for the chamber 35. A hole 37 is provided through the base of the cap 34 registering with the axial central portion of the chamber 35.

A rod 40 extends through the passageway 23 of the boss 20 and has a head 41 at one end thereof overlying the top of the cap 24 around the aperture 26 together with a cylindrical shank portion 42 snugly rotatable in the aperture 26. A threaded portion 43 extends from the shank 42 to lie within the interior of the cap 24 and receives, in threaded relation thereon, a disk or nut 44 fitting the interior of the cap 24 and having a notched peripheral portion 45 receiving the rib 27 to prevent rotation of the nut.

The other end of the rod 40 extends completely through the passageway 31 of the fitting 25 and has a threaded end portion 46 in the chamber 35 of the cap 34 and extending freely through the hole 37 of the cap. The bottom end of the rod has a screw-driver slot 47 therein so that the rod can be rotated to raise and lower the nut 44 along the threaded portion 43. A nut 48 is tightened on the threaded portion 46 of the rod to thrust against the bottom face of the cap 34 for locking the rod against rotation and for holding the entire assembly together.

A valve assembly 50 is slidably mounted on the rod 40 and includes a head 51 for cooperating with the seat 30 to control communication between the passageways 23 and 31. The head 51 is integrally affixed to a hollow tubular stem 52. This stem 52 projects through the passageways 23 and 31 and has a cylindrical end portion 53 extending into the cap 24 and a threaded end portion 54 extending into the cap 34.

A first diaphragm 55 composed of flexible impervious material such as rubber or the like, surrounds the portion 53 and is bottomed in a groove 56 at the base of the end portion 53. The peripheral portion of the diaphragm 55 is clamped between the top end of the boss 20 and a shoulder 57 provided in the cap 24 at the top end of the skirt 28 thereof. A ferrule or ring 58 is rolled on the portion of the diaphragm seated in the groove 56 to sealingly clamp the diaphragm on the end 53 of the stem 52.

The diaphragm 55 separates the chamber 23 from the interior of the cap 24.

A second diaphragm 59 snugly fits around the threaded portion 54 of the tubular stem 52 and is bottomed on a shoulder 60 at the end of this threaded portion 54. The peripheral portion of the diaphragm 59 is clamped between the bottom of the fitting 25 and the recessed top wall 61 of the cap 34. A nut 62 is threaded on the portion 54 of the stem 52 to thrust against the diaphragm 59 and clamp it against the shoulder 60.

The diaphragm 59 separates the passageway 31 in the fitting 25 from the chamber 35 in the cap 34.

A preloaded coil spring 63 is bottomed on the cap 34 in the chamber 35 thereof and has a small end coil embracing the threaded portion 54 of the valve stem 52 and bottomed on the nut 62 to urge the valve assembly in a direction to unseat the valve head 51 from its seat 30. A coil spring 64 is provided in the cap 24 to oppose the spring 63. This spring 64 acts between the top end 53 of the valve stem 52 and the nut or disk 44 threaded on the rod portion 43.

Rotation of the rod 40 is readily accomplished from outside of the tank 10 by loosening the nut 48 slightly, and by inserting a screw driver in the slot 47 of the rod. Rotation of the rod in opposite directions moves the nut or disk 44 along the threaded portion 43 thereof to vary the compression of the spring 64. Increased loading of the spring 64 by moving the nut 44 toward the diaphragm 55 is effective to decrease the selected outlet pressure for the pump as will be more fully hereinafter described.

The diaphragm 55 has a bottom flexing face exposed to the chamber 23 that is effectively equal in area to the top face of the valve head 51. Fluid pressure in the chamber 23 created by the pump therefore has no effect on the movements of the valve head 51 from its seat 30.

The top face of diaphragm 55 exposed to the chamber in cap 24 is under the pressure of the chamber 31 since two chambers are connected by intercommunicating drilled passages 20a, 24a, and 25a in the boss 20, cap 24, and fitting 25 respectively.

Therefore, the effective forces acting directly on diaphragm 55 and valve head 51 cancel each other completely. The control of the valve movement is thereby determined by the diaphragm 59 and by the springs 63 and 64.

Spring 63 is preloaded in assembly. After assembly, spring 64 is adjusted by means previously herein described until it opposes spring 63 to the extent that the resultant force acting on the valve assembly 50 gives the desired pressure in chamber 31 when the pump is operated. Spring 63 will normally exert a greater force than spring 64. Therefore the valve head 51 will be lifted from its seat 30 until the pressure in chamber 31 against diaphragm 59 becomes great enough to close the valve.

As shown in Fig. 1, an airplane engine E is equipped with a carburetor C for supplying fuel and air in proper admixture to the intake manifold M of the engine. A supercharger S supplies air under pressure to the carburetor C. An engine-driven fuel pump P supplies fuel to the carburetor C. In accordance with this invention, the pump 13 supplies supplemental fuel or water to the carburetor C through a pipeline 65 connected to the nipple portion 32 of the fitting 25. The supercharger S has its discharge outlet connected through a pipeline 66 with the threaded nipple 36 of the cap 34, so that the chamber 35 of the cap is subjected to supercharger air pressure.

The bottom face of the diaphragm 59, as shown in Fig. 2, is therefore subjected to supercharger air pressure, while the top face of this diaphragm is subjected to pressure in the passageway 31 of the fitting 25. While pressure in the passageway 31 tends to seat the valve head 51, as explained above, supercharger pressure in the chamber 35 tends to unseat the valve. If the supercharger pressure increases, increased pressure in the chamber 35 tends to open the valve, thus resulting in higher pressure in chamber 31. This arrangement tends to balance the pump pressure against supercharger pressure, and maintains a selected pressure differential above supercharger pressure. The selected pressure differential is obtained by the setting of the spring 64.

It should be noted that the function of diaphragm 59 is to allow an increase in supercharger pressure to increase the pressure an equal amount in chamber 31, and to close the valve against spring and supercharger forces when the pressure in chamber 31 has reached the desired value. The effective area of diaphragm 59 need not be equal to that of valve face 51 to give the regulator good balancing characteristics. In Fig. 2, the effective area of diaphragm 59 is shown relatively large, so that the forces moving the valve assembly will be great enough to overcome sticking tendencies caused by dirt, misalignment, etc. It is obvious that spring 63 must then be proportionally large also, thus ultimately establishing a practical limit to the size of diaphragm 59.

From the above descriptions it will be understood that this invention provides a pump regulator that is readily mounted on opposite ends of a member defining an open-ended passageway receiving fluid from a pump. The regulator is adjusted to maintain a desired selected pressure and this pressure can be based on a fluctuating base pressure to change therewith to maintain a constant differential. The pump regulator of this invention is especially useful on submerged type pumps for injecting water or supplemental fuel into the carburetor of an engine.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A pump regulator comprising in combination with a pump, means defining a passageway having a valve seat, an inlet to said passageway on one side of said seat, said inlet connecting the passageway with the outlet of the pump to receive pressured fluids from the pump, an outlet on the other side of said seat, a valve having a head coacting with said seat to separate the inlet and outlet of the passageway together with a tubular stem extending from both faces of the head, diaphragms secured to the end portions of the tubular stem for co-movement therewith, a rod carried by said means defining the passageway and slidably receiving said stem thereon, a spring retainer threaded on said rod, and means for rotating said rod to selectively position said spring retainer for changing the setting of the pump regulator.

2. A pressure regulator comprising means defining a passageway having a valve seat together with an inlet and an outlet on opposite sides of said seat, a rod extending through said passageway, a valve having a head portion coacting with said seat and a tubular stem portion slidable on said rod, diaphragms secured to opposite end portions of the tubular stem on opposite sides of said valve head, means sealingly clamping the peripheries of said diaphragm, springs acting on the opposite ends of the valve stem, a spring retainer threaded on one end of said rod, and means rotatably mounting said rod for rotation to shift the spring retainer thereon to vary the setting of the regulator.

3. A pump regulator comprising in combination with a submerged pump and motor unit having a mounting base for attachment to a tank wall and an open ended boss integral with said mounting base communicating with the outlet of the pumping chamber of said pump, an end cap covering the end of said boss remote from said mounting base, a first diaphragm between the end cap and boss, a passaged fitting mounted on the base plate end of said boss and having a pilot portion projecting into the boss to define a valve seat therein, said fitting having an open bottomed passageway with an outlet extending laterally relative to said valve seat, a lower member secured on said fitting having a recess aligned with the open bottom of said passageway in the fitting, a second diaphragm between said cover and fitting separating the recess and passageway, a valve member having a head coacting with said seat and a hollow stem attached at its opposite ends to said first and second diaphragms, a rod member extending through said hollow stem having a head portion overlying said end cap and rotating thereon together with a screw portion lying within said end cap, a nut threaded on said screw portion, means in said end cap coacting with said nut to prevent rotation of the nut relative to the cap, a spring between said nut and the adjacent end of said stem of the valve, a spring in said recess of the cover acting on the other end of said stem, said rod having a threaded portion extending freely through said cover, a rod locking nut threaded on said threaded end portion of the rod, and means for rotating said rod to shift the nut in said end cap for compressing the spring therein to change the setting of the regulator.

4. A pump regulator comprising means defining a passageway having an intermediate valve seat with an inlet and an outlet at opposite sides of said valve seat, diaphragms on opposite sides of said valve seat closing opposite ends of said passageway, a valve member having a head coacting with said seat and a tubular stem secured to said diaphragms, spring means abutting opposite ends of said stem, a rod member slidably supporting said stem, a spring retainer threaded on said rod member, a spring bottomed on said retainer acting on one end of said stem and means for rotating said rod member to shift said retainer for changing the load on said spring to vary the setting of the regulator.

5. A pump regulator comprising means defining an open ended tubular passageway having a valve seat therein, diaphragms at opposite ends of said passageway, an inlet to said passageway between one of said diaphragms and said seat, an outlet from said passageway between the other of said diaphragms and said seat, a tubular stemmed valve coacting with said seat for controlling pressure drop between said inlet and said outlet, a rod extending through the tubular stem of said valve to slidably support the valve, said diaphragms being secured to opposite ends of said valve stem, springs acting against opposite ends of said valve stem, a spring retainer adjustably mounted on said stem, and means for rotating said stem to shift the spring retainer and change the spring load for varying the setting of said regulator.

6. In a pressure regulator the improvement of a hollow stemmed valve controlling pressure drop in the regulator, diaphragms shiftable with said valve and exposed to pressures on opposite sides of the valve, springs acting on opposite ends of said hollow stem of the valve, a rod extending through said hollow stem of the valve and slidably mounting the valve, a spring retainer threaded on said rod, and means for rotating said rod to shift said retainer for varying the spring load on the valve stem to thereby change the setting of the regulator.

7. In combination with a submerged type pump and motor unit having a mounting base for attachment to a tank wall and an upstanding boss portion on said base having a first open end communicating with the interior of the tank and a second open end communicating with the exterior of the tank, said boss portion having an inlet for receiving fluids discharged by the pump, an end cap on said first open end of the boss, a diaphragm between said end cap and said boss, a spring retainer slidably mounted in said end cap behind said diaphragm, a fitting mounted on the second open end of said boss and having a pilot portion projecting into the boss to define a valve seat, said fitting having a diaphragm therein and an outlet passageway extending therefrom, a rod member depending from said cap through said hollow stem of the valve and through said fitting to extend beyond both diaphragms, said rod having a head member rotatably mounted on said end cap and a threaded portion in said end cap in screw thread relation with said spring retainer, said rod also having a second threaded portion extending through said fitting, a nut secured on said second threaded portion, a spring compressed between said retainer and one end of said valve stem, a second spring compressed between said fitting and the other end of said valve stem, said rod being rotatable to shift the spring retainer to vary the load on said springs to change the setting of the valve, and said diaphragms being effective to maintain a desired pressure differential above a selected base pressure in the outlet from said fitting.

8. A pressure regulator comprising casing means defining successive first spring, inlet, outlet, and second spring chambers, said inlet and outlet chambers having a valve seat therebetween, a valve assembly movably mounted in said casing means and having a valve head coacting with said seat to control fluid flow from the inlet to the outlet chambers, a first diaphragm between the first spring chamber and the inlet chamber, a second diaphragm between the second spring chamber and the outlet chamber, means attaching said diaphragms to said valve assembly, means defining a passageway venting the outlet chamber with the first spring chamber, opposed springs in said spring chambers acting on said valve assembly, and means accessible from outside of said casing means for adjusting at least one of said springs.

9. The pump regulator of claim 8 wherein the valve head and first diaphragm have equal and opposed effective areas exposed to the inlet chamber to eliminate valve shifting by varying inlet pressures thereon.

10. The pump regulator of claim 8 wherein the valve head and first diaphragm have equal effective areas exposed to the outlet chamber and first spring chamber to eliminate valve shifting by varying outlet pressures thereon.

FREDERICK E. SMITH.

REFERENCES CITED

The following references are of record in the file of this patent:

UNITED STATES PATENTS

| Number | Name | Date |
|---|---|---|
| 476,755 | Mills | June 7, 1892 |
| 822,184 | Chamberlain et al. | May 29, 1906 |
| 1,885,565 | Terry | Nov. 1, 1932 |
| 2,280,128 | Price | Apr. 21, 1942 |
| 2,365,650 | Shaw | Dec. 19, 1944 |
| 2,392,565 | Anderson et al. | Jan. 8, 1946 |
| 2,446,051 | Leslie | July 27, 1948 |